United States Patent
Sann et al.

(10) Patent No.: US 9,643,109 B2
(45) Date of Patent: *May 9, 2017

(54) FILTER DEVICE

(71) Applicant: Hydac Filtertechnik GmbH, Sulzbach/Saar (DE)

(72) Inventors: Norbert Sann, Riegelsberg (DE); Dirk Röder, Saarbrücken (DE)

(73) Assignee: HYDAC FILTERTECHNIK GMBH, Sulzback/Saar (DE)

( * ) Notice: Subject to any disclaimer, the term of this patent is extended or adjusted under 35 U.S.C. 154(b) by 191 days.

This patent is subject to a terminal disclaimer.

(21) Appl. No.: 13/261,911

(22) PCT Filed: Nov. 28, 2012

(86) PCT No.: PCT/EP2012/004901
§ 371 (c)(1),
(2) Date: May 29, 2014

(87) PCT Pub. No.: WO2013/083245
PCT Pub. Date: Jun. 13, 2013

(65) Prior Publication Data
US 2014/0311961 A1     Oct. 23, 2014

(30) Foreign Application Priority Data
Dec. 8, 2011 (DE) .................. 10 2011 120 680

(51) Int. Cl.
*B01D 27/08* (2006.01)
*B01D 35/30* (2006.01)
(Continued)

(52) U.S. Cl.
CPC ............ *B01D 27/08* (2013.01); *B01D 29/21* (2013.01); *B01D 29/96* (2013.01); *B01D 35/30* (2013.01);
(Continued)

(58) Field of Classification Search
CPC ........ B01D 27/08; B01D 35/30; B01D 29/21; B01D 29/96; B01D 2201/34; B01D 2201/291; B01D 2201/40
(Continued)

(56) References Cited

U.S. PATENT DOCUMENTS 2,413,991 A   1/1947  Newman
4,719,012 A   1/1988  Groezinger
(Continued)

FOREIGN PATENT DOCUMENTS

DE          11 89 520 A     3/1965
DE     10 2004 029 225 A1   1/2006
WO       WO 2009/019442 A1  2/2009

*Primary Examiner* — Madeline Gonzalez
(74) *Attorney, Agent, or Firm* — Wenderoth, Lind & Ponack, L.L.P.

(57) ABSTRACT

A filter device has a filter element (3) received in a filter housing (1) and has a holding device (19) for detachably fixing the filter element in the filter housing (1). Corresponding threads (23, 33) form a screw connection between a housing cover (5) of the filter housing (1) and the filter element (3). A sealing device (29, 35) imparts a sealing action between the filter element (3) and the housing cover (5). The screw connection is formed by threads (23, 33) situated in the interior (22) of the filter element (3). The thread (33) assigned to the filter element (3) is situated on a connecting pipe piece (31) that, as a constituent part of an end cap (17) of the filter element (3), extends into the inner filter cavity (22) of the filter element (3). The thread (23) assigned to the housing cover (5) is situated on a receiving pipe piece (21), which can be screwed to the connecting pipe piece (31) of the filter element (3). The receiving pipe piece is formed by a separate component in the form of a pipe piece (21) attached to the housing cover (5).

9 Claims, 3 Drawing Sheets

(51) Int. Cl.
*B01D 29/21* (2006.01)
*B01D 29/96* (2006.01)

(52) U.S. Cl.
CPC .... *B01D 2201/291* (2013.01); *B01D 2201/34* (2013.01); *B01D 2201/40* (2013.01)

(58) Field of Classification Search
USPC ..... 210/236, 450, 493.2, 232, 441, 444, 454
See application file for complete search history.

(56) References Cited

U.S. PATENT DOCUMENTS

| | | | |
|---|---|---|---|
| 5,762,788 A | 6/1998 | Gullett | |
| 6,481,580 B1* | 11/2002 | Amstutz | B01D 29/15 210/440 |
| 2009/0101595 A1* | 4/2009 | Allott | B01D 35/153 210/767 |
| 2011/0073537 A1 | 3/2011 | Allott | |

\* cited by examiner

FILTER DEVICE

FIELD OF THE INVENTION

The invention relates to a filter device having at least one filter element that can be accommodated in a filter housing and having a retaining device releasably securing the filter element in the filter housing. The retaining device has corresponding threads for forming a screw connection that acts between a housing cover of the filter housing and the filter element. A sealing device forms a seal between the filter element and the housing cover. The screw connection is formed by threads situated at least partially in the interior of the filter element. The thread belonging to the filter element is situated on a connecting piece that extends as a component of an end cap of the filter element into the interior filter cavity of the filter element. The thread belonging to the housing cover is situated on a receiving pipe piece on the housing cover that can be screwed to the connecting piece of the filter element.

BACKGROUND OF THE INVENTION

Filter devices for accommodating filter elements are available on the market in a variety of embodiments. Such filter devices eliminate a not insignificant amount of the manufacturing cost for the design of the retaining device for releasably securing the filter element inside the respective housing as well as of the sealing device for sealing the interior of the filter element with respect to the filter housing.

With a filter device of the generic type defined in the introduction as disclosed in the DE 10 2004 029 225 A1, the screw connection has an internal thread incorporated directly into the housing cover into which an external thread can be screwed. The external thread is formed on a connecting piece protruding outward on the respective filter element. The sealing device is formed by an axially protruding sealing edge surrounding the connecting piece concentrically. This sealing edge forms the seal due to pressure applied to the sealing edge when the screw connection is tightened. This solution is problematical inasmuch as the security of the seal depends on the pressing force acting on the sealing edge, which requires strong tightening of the screw connection. This strong tightening leads to the requirement that the end cap of the filter element must be designed to have dimensional stability to prevent deformation of the end cap when the screw connection is tightened strongly. Problems arise in this regard with the usual design of end caps made of a plastic material.

DE 11 89 520 discloses a disposable filter for fluids. A replaceable filter element has an end cap designed for conducting fluid to the clean side as well as to the unfiltered side and can be disposed in a housing. The end cap can be screwed to a pipe connection on the filter housing. Furthermore, a peripheral sealing element is provided in a radially outer region between the filter housing and the end cap.

U.S. Pat. No. 4,719,012 discloses a screw-on disposable filter element. A sealing configuration provides a pipe connection for sealing the fluid connection from the inside of the filter element with respect to the pipe connection.

SUMMARY OF THE INVENTION

An object of the invention is to provide an improved filter device, which will ensure a reliable securing of the filter element and a reliable sealing of the filter element with respect to the housing cover, despite being simple and inexpensive to manufacture.

This object is basically achieved according to the invention by a filter device having a receiving connection formed by a separate component in the form of a pipe piece mounted on the housing cover. This pipe piece leads to the advantageous possibility of stipulating the use of filter elements of a certain specification by providing the respective housing covers with receiving connections in the form of specially designed pipe pieces. Pipe pieces having specially designed threads allow a screw connection only with a matching thread of the connecting piece of the filter element and may be used for this purpose. The use of inexpensive elements as replacement parts can therefore be avoided because, in addition to their fundamentally inferior quality, they may often result in malfunctions for the intended medium to be filtered due to their less specific adaptation.

The fact that the screw connection is formed by threads situated at least partially in the interior of the filter element leads to the advantageous possibility of providing a sealing configuration. The sealing configuration can be assigned to the threads situated in the interior of the filter element, for the sealing device instead of an axial seal to be compressed by tightening of the screw connection. The axial seal is provided on the outside of the end cap. A radial gasket whose sealing effect does not depend on a sealing force which is to be created by a suitably strong tightening of the screw connection may therefore be used in a structurally simple manner, for example.

The thread belonging to the filter element is situated on a connecting piece that extends as part of an end cap of the filter element into its inner filter cavity.

The thread belonging to the housing cover is situated to particular advantage on a receiving connection on the housing cover that can be screwed onto the connecting piece of the filter element.

With regard to the design of the sealing device, advantageously, the sealing device has as least one sealing element, which seals the outside of the receiving pipe piece against the inside of the connecting piece of the filter element.

The configuration may especially advantageously be designed in such a way that at least one thread-free section forms a sealing region in the entrance area of the connection piece of the end cap, where at least one sealing element forming the seal to the receiving connection of the housing cover.

A thread-free section of the sealing region may also be formed in the initial region of the receiving connection of the housing cover.

The configuration may advantageously be obtained such that the thread on the receiving connection is formed by an external thread and the thread on the connection piece is formed by an internal thread. Furthermore the thread pitches of the threads may be designed as a round thread.

For the sealing between the outside of the receiving connection and the inside of the connection piece of the filter element, an annular groove may be formed for a respective sealing element in the sealing region of the receiving connection.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
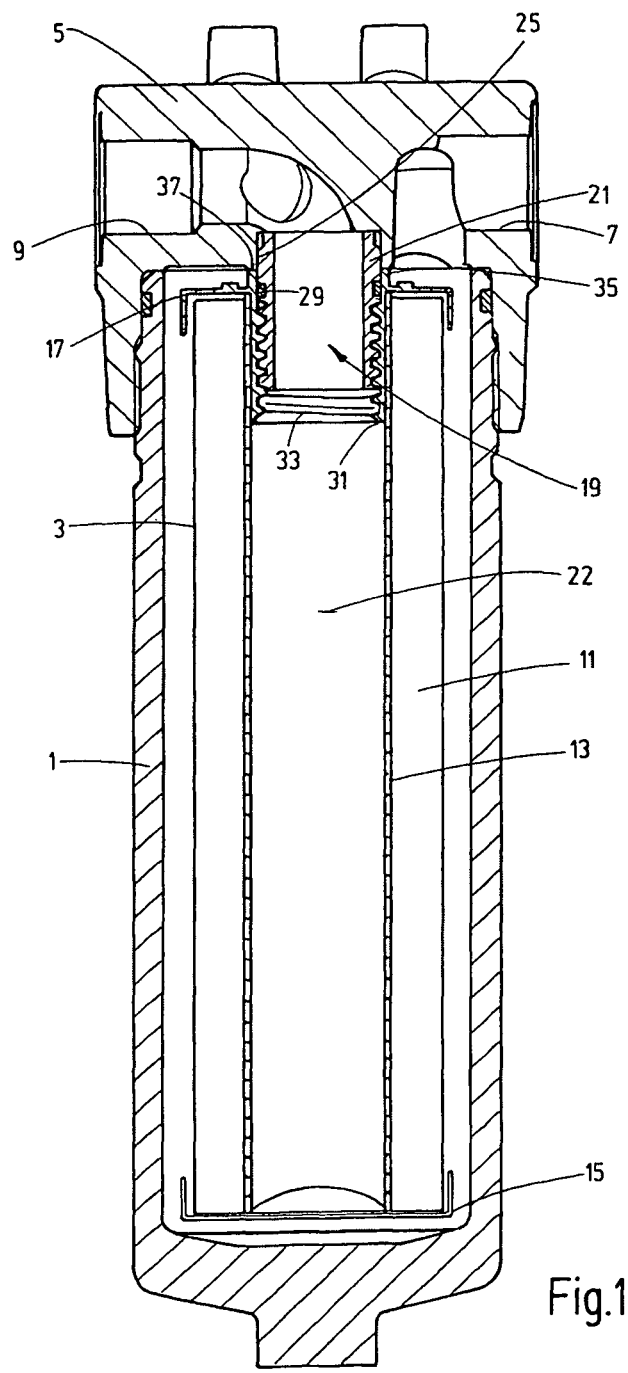
FIG. 1 is a side view in section of a filter element according to an exemplary embodiment of the invention.

The exemplary embodiment, which is illustrated as a whole in FIG. 1, has a closed pot-shaped filter housing 1 closed on the bottom side, accommodating a filter element 3. The filter housing 1 is sealed on the end at the top of the drawing by a housing cover 5, which is designed as a screw cover and has fluid connections. One fluid connection forms the housing inlet or inlet passages 7 for inflow of unfiltered fluid. The other fluid connection forms the housing outlet or outlet passages 9 for discharging the filtrate. The filter element 3, designed as a filter cartridge, has a filter medium 11 surrounding a fluid-permeable supporting tube 13 in the customary manner with such filter elements. The filter medium preferably is constructed of a multilayer filter mat, pleated in a star-shaped or stellate pattern. The filter medium 11 is retained at the ends by a lower end cap 15 and an upper end cap 17 in the manner customary with such filter elements 3. The retaining device or retainer for releasably securing the filter element 3 in the filter housing 1 is formed by a screw connection between the upper end cap 17 and the housing cover 5.

Figure 2:
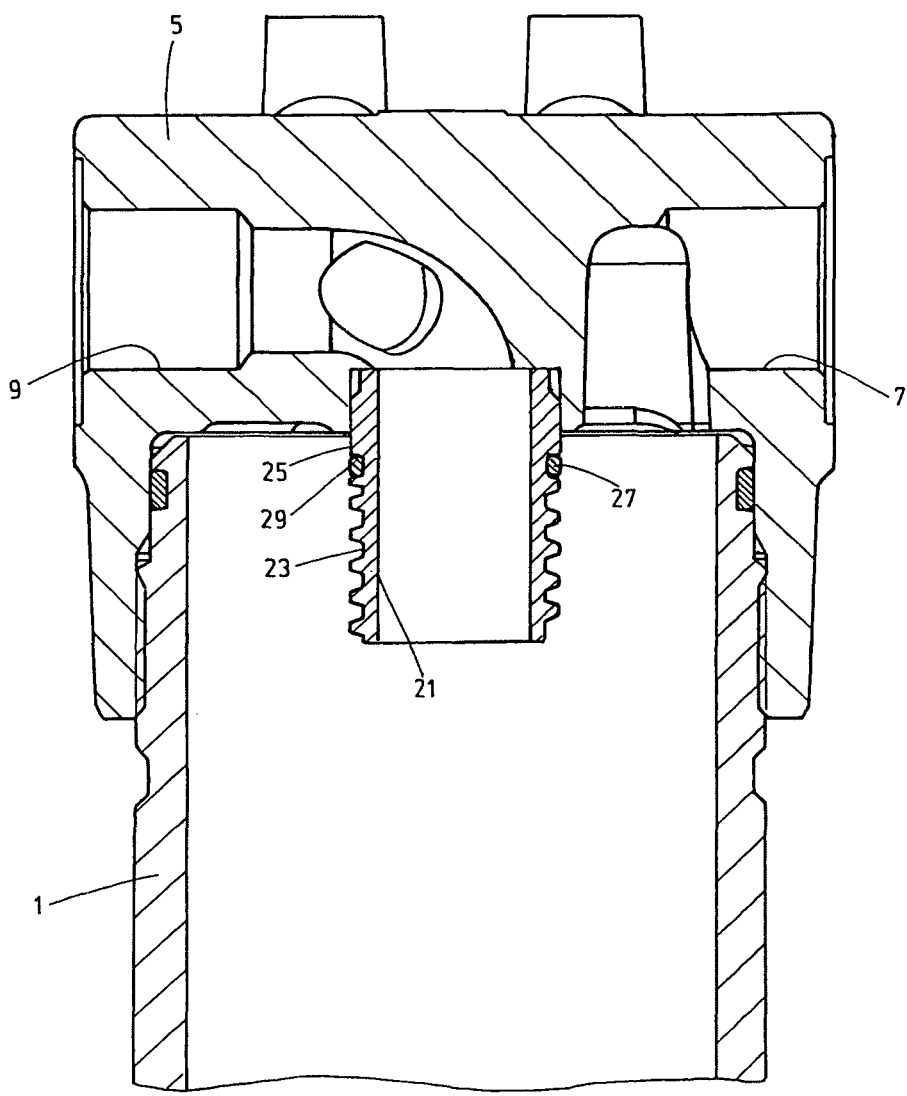
FIG. 2 is a partial side view in section, shown on a larger scale in comparison with FIG. 1, of just the part of the filter housing of the exemplary embodiment adjacent to the housing cover without the filter element inserted.
Figure 3:
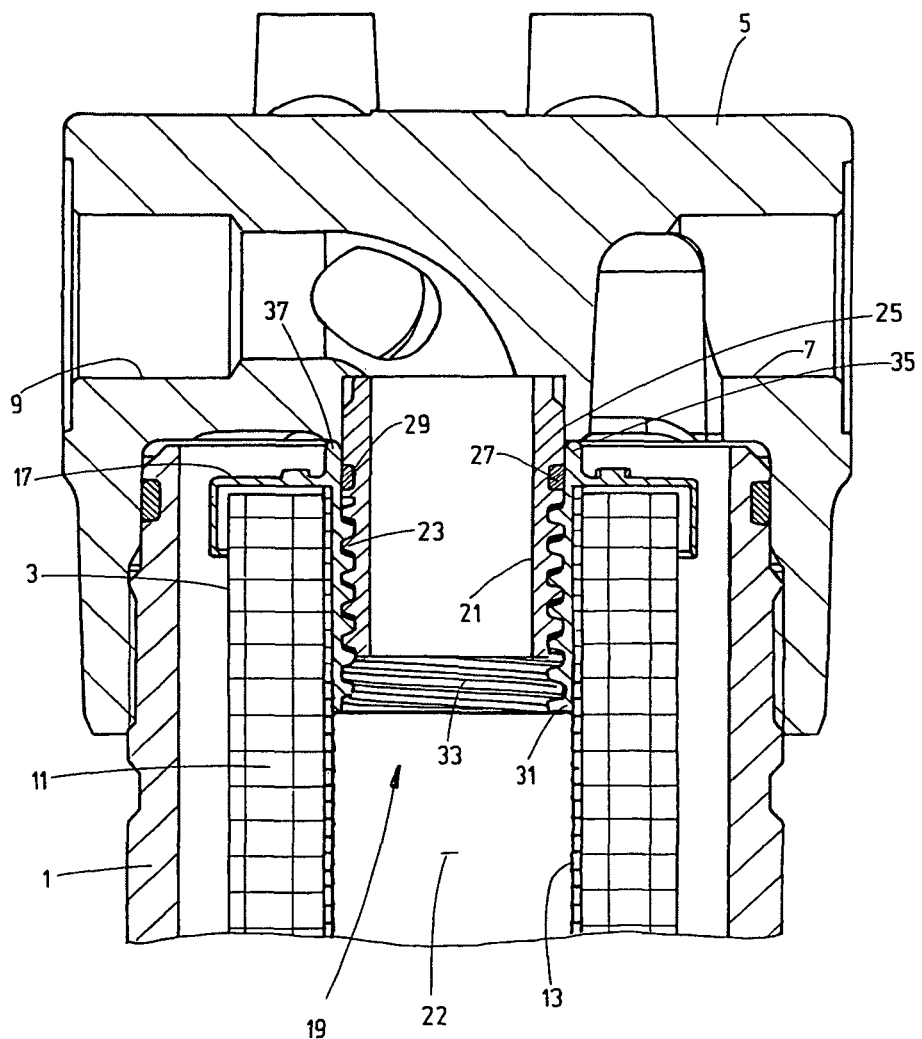
FIG. 3 is a partial side view in section, corresponding to FIG. 2, but with the filter element inserted.

This retaining device 19 can be seen more clearly in FIGS. 2 and 3 in particular. The component of the retaining device 19 belonging to the housing cover 5 is formed by a receiving connection in the form of a pipe piece 21, which protrudes axially from the housing cover 5 into the interior of the filter housing 1. The pipe piece 21 establishes the fluid connection between the interior filter cavity 22 surrounded by the supporting pipe 13 in the case of the filter element 3 in the filter housing 1 (see FIG. 1). The inner filter cavity forms the clean side in filtration and establishes the connection to the housing outlet 9 of the housing cover 5. The pipe piece 21, attached to the housing cover 5 by pressing, for example, has, starting from its free end, a thread 23 in the form of an external thread with thread pitches forming a round thread (see FIG. 2). In a thread-free section 25 connected to the upper end of the thread 23, an annular groove 27 forms the seat for a ring-shaped sealing element 29, which is part of a sealing device assigned to the retaining device 19 and performs the sealing function between the filter element 3 and the housing cover 5.

The component of the retaining device 19 assigned to the filter element 3 is formed by a connection piece 31 integrally molded on the upper end cap 17 as a one-piece component. The connection piece 31 extends into the interior filter cavity 22 of the filter element 3 and has, starting from the inner end, a thread 33 having a thread pitch corresponding to the thread 23 of the pipe piece 21.

A thread-free section 35 that forms the sealing device in cooperation with the sealing element 29 on the thread-free section 25 of the pipe piece 21 is connected to the upper end of the thread 33.

As shown best in FIG. 3, the upper end of the thread-free section 35 of the end cap 17 is situated at 37 (FIG. 3) on the housing cover 5 in the case of the filter element 3 situated in the filter housing 1 and secured by screw connection. The sealing element 29 directed toward the thread-free section 35 of the connecting piece 31 seals the filter cavity 22 forming the clean side in filtration with respect to the pipe piece 21, and thus, seals it with respect to the housing cover 5.

Due to the fact that the position of the filter element 3 is secured by screw connection to the receiving connection on the housing cover 5, i.e., to the thread of the pipe piece 21, this arrangement ensures that only a filter element 3 conforming to a given specification can be installed in the filter housing 1. The design of the retaining device according to the invention, with a pipe piece 21 serving as the receiving connection, leads to the possibility of establishing the filter device for different intended purposes, for the use of a suitable type of filter element 3 provided for this purpose. The same design of the filter device in each case is permitted by providing the housing cover 5 with a pipe piece 21, which fits the given type of filter element 3.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing having a detachable housing cover thereon;
a filter element in said filter housing;
a retainer in said filter housing releasably securing said filter element in said filter housing, said retainer having corresponding and mating first and second threads forming a screw connection between said housing cover and said filter element;
a sealing element in a sealing region between said filter element and said housing cover;
an end cap on said filter element, said end cap having a connecting piece extending on said end cap, said first thread being on said connecting piece and at least partially in an interior cavity of said filter element; and
a receiving connection on said housing cover, said second thread being on said receiving connection, said receiving connection being threaded into said connecting piece by said first and second threads and being a pipe piece formed as a separate component from and mounted on said housing cover, said pipe piece being secured by pressing into said housing cover in such a way that said pipe piece can be replaced for adapting to said filter element with pre-defined specifications and such that said first and second threads can be engaged to locationally secure said filter element in said filter housing, said sealing element being between and forming a seal between an outside of said receiving connection and an inside of said connecting piece, said sealing region being formed by a thread-free section in an entrance area of said connecting piece and a thread-free section on an initial region on said receiving connection.

2. A filter device according to claim 1 wherein
said first thread on said connecting piece is an internal thread; and
said second thread on said receiving connection is an external thread.

3. A filter device according to claim 1 wherein
said first and second threads are round threads.

4. A filter device according to claim 1 wherein
said receiving connection comprises an annular groove in said sealing region thereof receiving said sealing element.

5. A filter element according to claim 1 wherein
a seal is located between said filter housing and said housing cover.
6. A filter device according to claim 1 wherein
said pipe piece extends only partially in said housing cover.
7. A filter device according to claim 1 wherein
said pipe piece is not movable in said filter housing and said cover when connected to said filter element.
8. A filter device according to claim 1 wherein
said housing cover has inlet and outlet passages therein.
9. A filter device according to claim 8 wherein
said filter housing is pot-shaped with an integrally closed end opposite said housing cover.

* * * * *